(12) United States Patent
Miller

(10) Patent No.: US 9,505,502 B2
(45) Date of Patent: Nov. 29, 2016

(54) TIRE PRESSURE MONITORING SYSTEM

(71) Applicant: The Boeing Company, Chicago, IL (US)

(72) Inventor: Trent Daryl Miller, Seattle, WA (US)

(73) Assignee: The Boeing Company, Chicago, IL (US)

( * ) Notice: Subject to any disclaimer, the term of this patent is extended or adjusted under 35 U.S.C. 154(b) by 134 days.

(21) Appl. No.: 14/220,887

(22) Filed: Mar. 20, 2014

(65) Prior Publication Data
US 2015/0224831 A1 Aug. 13, 2015

Related U.S. Application Data

(60) Provisional application No. 61/939,163, filed on Feb. 12, 2014.

(51) Int. Cl.
*B60C 23/04* (2006.01)
*B64D 47/00* (2006.01)
*B64D 45/00* (2006.01)

(52) U.S. Cl.
CPC ........... *B64D 47/00* (2013.01); *B60C 23/0408* (2013.01); *B60C 23/0479* (2013.01); *B64D 45/00* (2013.01); *B60C 23/0474* (2013.01); *B60C 23/0476* (2013.01); *B60C 23/0486* (2013.01); *B64D 2045/0085* (2013.01)

(58) Field of Classification Search
CPC ................ B60C 23/0486; B60C 23/0476
See application file for complete search history.

(56) References Cited

U.S. PATENT DOCUMENTS

| | | | |
|---|---|---|---|
| 5,460,037 A | 10/1995 | Chamussy et al. | |
| 6,486,771 B1 | 11/2002 | Fuller et al. | |
| 7,323,975 B2 * | 1/2008 | Hall | B60C 23/0408 340/442 |
| 8,573,047 B2 | 11/2013 | Finefrock | |
| 2008/0266073 A1 | 10/2008 | Tu et al. | |
| 2013/0009763 A1 * | 1/2013 | Koga | B60C 23/0476 340/442 |
| 2014/0002258 A1 * | 1/2014 | Chen | B60C 23/0455 340/447 |
| 2015/0101702 A1 * | 4/2015 | Dean | B60C 23/003 141/4 |
| 2015/0134197 A1 * | 5/2015 | Cahill | B60C 23/0476 701/33.7 |

FOREIGN PATENT DOCUMENTS

WO 2009/036547 3/2009

* cited by examiner

*Primary Examiner* — Todd Melton
(74) *Attorney, Agent, or Firm* — McDonnell Boehnen Hulbert & Berghoff LLP

(57) ABSTRACT

A tire pressure monitoring system for wheeled vehicles is presented that uses a vehicle computer, a vehicle position sensor, a tire pressure sensor, and ambient temperature readings to determine whether the vehicle has remained stationary for a predetermined time period before determining and reporting cold tire pressure.

17 Claims, 2 Drawing Sheets

TIRE PRESSURE MONITORING SYSTEM

CROSS REFERENCE TO RELATED APPLICATIONS

The present application claims priority to U.S. Provisional Patent Application No. 61/939,163 filed Feb. 12, 2014. The entire contents of this application are herewith incorporated by reference into the present application.

FIELD OF THE INVENTION

This invention relates to a tire pressure monitoring system for wheeled vehicles that periodically interrogates a pressure sensor associated with a tire to determine the tire pressure while simultaneously recording the vehicle position, the park time, and the ambient air temperature in non-volatile memory in an on-board computer. The invention has particular application for aircraft tires where proper tire pressure is particularly important.

BACKGROUND

Proper tire pressure on any wheeled vehicle is important from both a safety and an operating cost perspective. With regard to aircraft, especially large commercial airplanes, the weight of such vehicles can affect tire pressure. Low pressure leads to tire over deflection and heat build-up within the tire, which can result in premature or excessive wear. The heavier the vehicle, when supported by an under pressurized tire, the greater the premature wear, such as ply separation, uneven wearing of the tread, or rapid wearing of the shoulder. Alternatively, over inflating a tire may cause excessive wearing of the tread center, reduced braking efficiency, abnormal tire growth, and may make the tread more susceptible to cutting by foreign objects. Regardless of whether the tire is over inflated or under inflated, the negatives associated with each translate directly into increased maintenance cost.

Another problem with heavy vehicles, such as commercial aircraft, is that heat build-up in the tires and wheel rims occurs rapidly when such vehicles are moving even short distances and especially after landing. This heat build-up increases tire pressure and is slow to dissipate thus making it difficult to accurately measure the proper tire pressure within short windows of time. To properly determine tire pressure the measurement should be taken only when the internal tire gas temperature is equal to the ambient temperature. This is considered a "cold tire" pressure. The heat generated by rolling large heavy wheeled vehicles can increase tire gas temperatures to such levels that it may require 3-4 hours for the tire, the rim, and the internal tire gas temperature to equilibrate with the external ambient air temperature.

Further complicating this temperature difference between the ambient outside air temperature and the tire gas temperature is that aircraft operators prefer flexibility in timing tire pressure checks. Some operators find it difficult or too inconvenient to measure tire pressure immediately after an overnight or extended park time when tires have reached the preferred equilibrium with the outside ambient temperature. As such, airline maintenance personnel experience difficulty ensuring tires are at the proper and recommended pressure. No known existing tire pressure indication system takes into account a procedure for verifying that the tire is at the cold tire pressure temperature before a measurement is taken. Likewise, no known tire pressure monitoring system considers or calculates a stationary or park time of the vehicle to ensure that the temperature of the tire gas necessarily equals the ambient temperature. Although some systems attempt to measure tire gas temperatures and make a temperature adjustment during maintenance using thermocouples in the wheel structure, these systems are flawed because tire temperature is non-uniform during and immediately following braking and rolling.

Yet another concern arises when an aircraft takes off for a destination where ambient temperatures are significantly lower ($\geq 25°$ C.) from those of the airport of departure. The minimum required cold pressure must be maintained for the cooler climate. Without an accurate determination of cold tire pressure at the departure airport it is very difficult, if not impossible, to adjust the tire pressure before departure so that the tires are correctly inflated at the required or recommended cold tire pressure for the ambient colder conditions at the destination airport or at the coldest final destination airport.

Accordingly, there is a need to develop a tire pressure monitoring system that takes into account the above-mentioned concerns. The system should be capable of determining accurate tire pressures and to recommend corrective action to either inflate or deflate a tire not at the recommended cold tire pressure or at an extreme temperature for a destination location. Such a system would significantly reduce airline operating costs due to improved tire life and improve safety.

SUMMARY

The present invention is directed to a tire pressure monitoring system for wheeled vehicles and is particularly applicable to very heavy vehicles, such as commercial aircraft. Airplane tire manufacturers typically recommend that inflation pressure of each aircraft tire be checked daily, and that the pressure gauge also be calibrated regularly. Maintaining correct tire inflation pressure is one of the most important factors in any preventive maintenance program. It is recommended that inflation pressure checks should be executed only on cold tires, i.e., those for which the tire and the pressured gas inside the tire is at a temperature that equals the ambient outside air temperature. Tire manufacturers also consider a tire, whatever its size or the service it performs, to be cold after at least 3-4 hours of non-use or immobility, except when exposed to direct sunlight.

Although the system of the present invention can be used on any vehicle having pressurized gas tires, the following description of the invention will be described with particular emphasis for use on large airplanes. As mentioned, for safety and maintenance cost reasons, it is useful in an airplane to monitor information relating to each tire, such as pressure or temperature information, for example, and to provide this information in the cockpit or to flight line tire service personnel. Typically such information is obtained and communicated from the wheel rim to which the tire is mounted using electronic sensors and/or thermocouples that communicate the data to electronics located on the wheel axle or other location on the aircraft. Aircraft also have onboard computer systems that use microprocessors and volatile memory storage to run many systems throughout the aircraft in addition to flight control including monitoring geographic position sensors, such as a global positioning system or inertial navigation system. The present invention is advantageous in that there is no need to try and determine the temperature of the pressurized gas within the tire.

The present invention does use information received from an onboard vehicle position sensor. On such sensor is based on an inertial navigation system (INS) that is based on motion sensors (accelerometers) and rotation sensors (gyroscopes) to continuously calculate via dead reckoning the position, orientation, and velocity (direction and speed of movement) of the vehicle when moving without the need for external references. A comparison of INS readings over time will indicate whether the vehicle has remained stationary. Using this information and computer clock times the so-called "park time" can be determined, which will be indicative of how long the vehicle remained immobile. Alternatively, or in addition to INS, a global positioning system (GPS) can be used to determine park time. GPS is a space-based satellite navigation system that provides location and time information provided there is an unobstructed line of sight to multiple GPS satellites.

An object of the present invention is to solve the problem of obtaining an accurate reading of the cold tire pressure for heavy vehicles where braking and tire deflection due to load weight causes high tire temperature while at the same time maintaining a reasonable and flexible maintenance schedule.

Another object of the invention is to monitor, record and report accurate cold tire gas pressures using a fully automated computer based system without the need for human intervention and without measuring the temperature of the tire, wheel or the pressurized gas.

Yet another object of the invention is to determine an accurate cold tire pressure at an existing airport location, determining an expected ambient temperature at a future airport location and calculating a pressure adjustment to be made to the tires while at the existing location so that upon arrival at the new location the tires will be properly inflated.

The present invention achieves these objections with an improved vehicle tire pressure monitoring system for a wheeled vehicle, preferably a heavy aircraft, that uses the following components in electronic communication with each other, without the need for human intervention. The system uses a computer located on the vehicle that has a data processing unit containing a microprocessor that is programmed using loadable software to execute a processing function that retrieves and modifies data retrieved from various electrical components on the vehicle and from data storage units. The computer is also programmed to allow local and remote access through various types of user interfaces to the data collected, preferably in a prepared report format. The computer is in communication with a pressure sensor that is connected to a wheel and in fluid communication with a gas contained in a tire mounted to the wheel. The pressure sensor can be configured to transmit gas pressure data indicative of a gas pressure within the tire to the computer data storage memory, preferably using wireless communication technology, such as a radio frequency identification (RFID). The system also includes a vehicle position sensor located on the vehicle that communicates with the computer to track and record the geographic position and movement of the vehicle. The computer monitors time with an internal clock and the position indicated by the sensor. With these inputs the microprocessor contained in the computer can calculate a park time of the vehicle indicating non-movement or immobility of the vehicle.

The computer has a non-transitory computer readable medium having instructions stored thereon that, in response to execution by the microprocessor causes the processor to execute software instructions that collect information from the pressure sensor and the vehicle position sensor, records vehicle data in non-volatile memory, such as, outside ambient air temperature, clock time, vehicle geographic position information, and tire gas pressure. The loaded software also allows the computer to transmit the stored data, automatically generate reports, and send warning notifications to a variety of human interface devices, including a handheld graphical interface, or other receiving units, such as, a server, network, the Internet, or other computer system located remotely from the vehicle. This can be achieved using wired or wireless communication technology. At a minimum, the computer communicates the information from the tire pressure monitoring system to an electronic maintenance log resident in the vehicle cockpit such that an operator of the vehicle or maintenance personnel can access the collected information, along with other information concerning the vehicle collected by the computer.

The computer can be programmed to only record the tire pressure sensed by the pressure sensor if the computer has determined that the vehicle has not moved for a predetermined time period, preferably set at least to 3 hours, to insure that the tire and pressurized gas temperatures have equilibrated with the ambient air temperature surrounding the vehicle. The method of the present invention does not require or involve a determination of the tire, wheel and/or gas temperature in order to perform the steps of monitoring the vehicle tire pressure. This makes the present invention more cost effective because additional electronic components for attempting to measure tire gas temperature are not needed to determine tire pressure. One particular method of the present invention involves recording the tire pressure and the ambient outside temperature after the vehicle has remained stationary at an existing location for a predetermined time period, determining a future destination of the vehicle and a future ambient temperature expected at the future destination, comparing the recorded tire pressure to a target or recommended cold tire pressure and determining whether the tire pressure is over inflated or under inflated for the ambient temperature at the existing location. Using this information, the computer will calculate a new recommended tire pressure based on the future ambient temperature.

A notification signal or message is sent to a maintenance log or other receiving unit recommending that the tire pressure be adjusted to the new recommended tire pressure while the vehicle is located at the existing location and before it leaves for the new destination. The method also includes a triggering feature that is activated when the computer is powered, turned-on or otherwise energized that causes the computer to make a determination if the vehicle has remained stationary for at least the predetermined park time. This is accomplished by comparing the data obtained from the position sensor immediately before the computer was powered down or was turned off to the data received from the position sensor immediately after the computer is powered up. If the computer determines that the predetermined park time has elapsed, then the computer will interrogate the tire pressure sensor along with the ambient air temperature surrounding the vehicle. Using an electronic look up table or similar stored data of recommended cold tire pressures, the computer will make a determination if the cold tire pressure measured is higher or lower than that recommended or required pressure. If so, the computer will provide a notification to a user interface indicating that a pressure adjustment is needed. If the tire pressure monitoring system, including the computer, is not powered down because, for example, it is connected to a battery back-up system, then the triggering feature is not used and the computer continuously monitors the park time.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present invention will become more fully understood from the more detailed description presented below and the accompanying drawings which are presented by way of illustration only, and thus, are not limitations of the present invention, and wherein.

Corresponding parts are marked with the same reference symbols in all figures.

DETAILED DESCRIPTION

Figure 1:
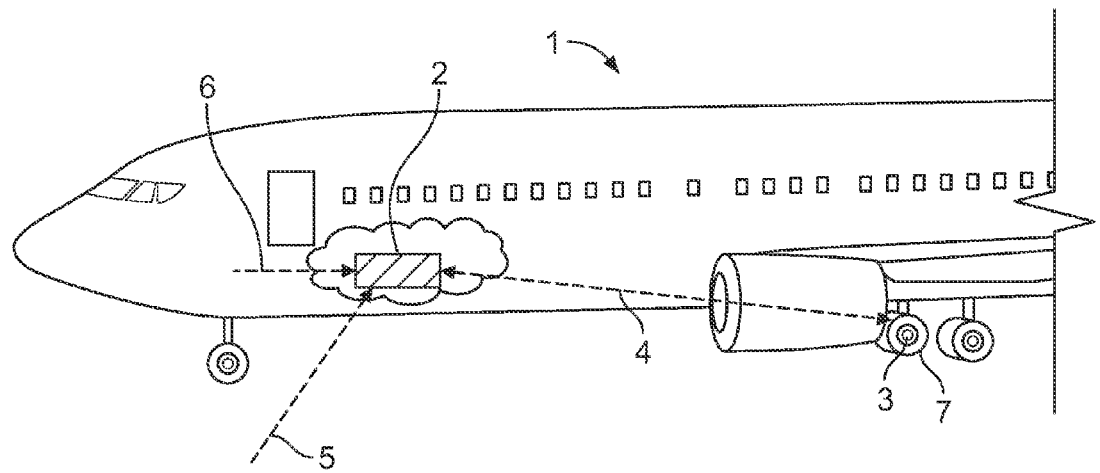
FIG. 1 illustrates one possible advantageous embodiment of the present invention utilized on an airplane.

As mentioned, the present invention can be employed with any wheeled vehicle. The following description of one possible application and embodiment of the invention is described specially for use on a large aircraft, such as, a commercial passenger or cargo plane 1 as depicted in FIG. 1. The tire pressuring monitoring system (TPMS) of the present invention 2 is shown located in the aircraft and in the case of a retrofit to an existing aircraft the system is located where the original onboard computer is located. The term "computer" is used to generally mean a microprocessor and memory, where instructions contained in the memory are executed to receive and/or calculate data that is stored in the memory, which is then made accessible to one or more users. The TPMS 2 transmits and receives signals or data 4 from tire pressure sensors 3 located and associated with each wheel 7 of plane 1. The TPMS 2 also receives ambient air temperature data 5 from a sensor located on the aircraft, where the sensor can be a thermocouple, infrared device or other type of sensor capable of determining the air temperature surrounding the aircraft. In some cases, other vehicle systems monitor ambient temperature and this data can be supplied to the TPMS via the vehicle electrical data bus communication system. Vehicle geographic position data 6 is also received by the TPMS.

Figure 2:
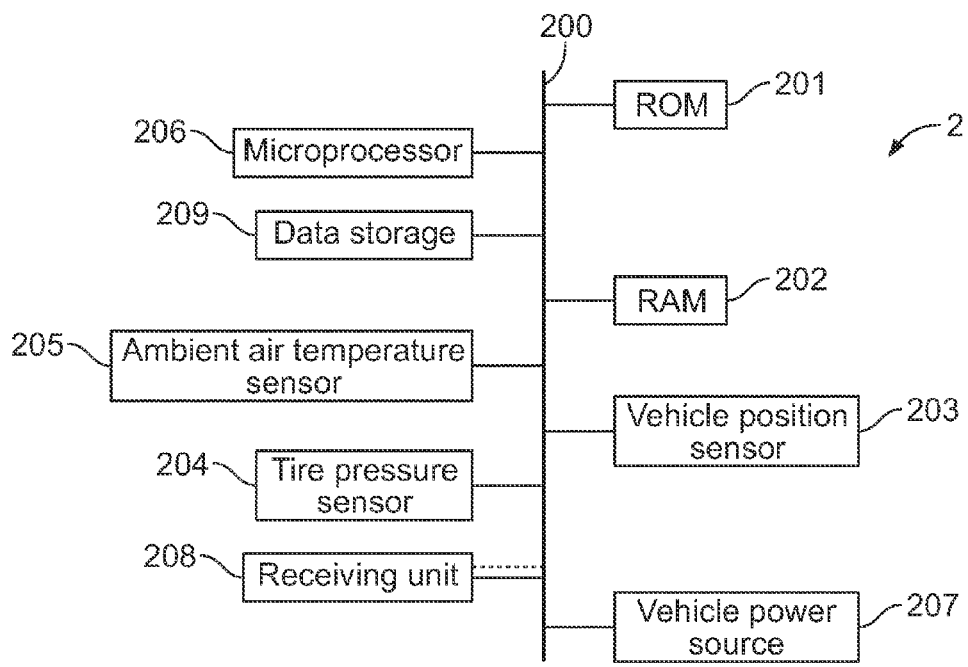
FIG. 2 schematically illustrates one possible electronic configuration of one advantageous embodiment of the present invention.

FIG. 2 schematically illustrates some of the components of the TPMS, which are typically located in one or more protective housings and interconnected by bus 200, namely a microprocessor 206, random access memory (RAM) 202, read-only memory (ROM) 201, one or more tire pressure sensors 204, an ambient air temperature sensor 205, one or more receiving units 208 located on the vehicle or remotely (dashed line), a data storage unit 209, and a vehicle position sensor 203. All of these components are powered by a vehicle power source 207 that can include power generated by the vehicle engines, externally connected power cables, on-board battery system or a combination of these. The receiving unit 208 can include a user interface whereby the user can interrogate the TPMS and receive data, reports, and/or notices generated by the microprocessor 206. Software updates can be uploaded using the receiving unit 208.

Input to the TPMS 2 using the receiving unit 208 can be accomplished with one or more push buttons or alternatively as so called soft keys wherein the function of the respective soft key is displayed on a display. Alternatively, the user input can be a key board or a touch screen. In some cases, the user input can comprise a microphone for receiving speech input so that data can be entered via speech input. Preferably, the data from the TPMS is transmitted to an existing display unit comprising an LCD or LED display located in the airplane cockpit that is accessible by maintenance personnel or the pilot/co-pilot. The receiving unit can also be configured to receive and transmit data using a wireless interface, such as IRDA, Bluetooth, GSM, UMTS, ZigBee, or WI-FI, etc. Alternatively, the interface is a wired interface, such as a USB port, serial port, parallel port, network card, etc., for receiving and transmitting data. Furthermore, the TPMS can be configured to transmit data via SMS, e-mail or via mobile Internet connection, which offers the possibility to send warnings or other important notices regarding the inflation condition the tires.

Stored in the ROM 201 is software and firmware that governs operation of TPMS 2. The software/firmware contains instructions that are executed by the microprocessor 206 using the RAM 202. The software/firmware stored in the ROM 201 can be uploaded and is operable to operate TPMS 2 as generally described in the logic flow diagram shown in FIG. 3. The data storage unit 209 is arranged to store data input via the receiving unit 208, the tire pressure sensor 204, the vehicle position sensor 203, and the ambient air temperature sensor 205, and/or data processed by the microprocessor 206. Furthermore, data storage unit 209 is arranged to provide stored data to the microprocessor 206 and/or to the receiving unit 208. The data storage unit 209 is preferably implemented as a semiconductor non-volatile memory. Alternatively, it is implemented as a hard disk memory or an on-chip memory of the microprocessor 206.

The tire pressure sensor 204 is preferably physically mounted in each wheel rim associated with each tire being monitored. A preferred tire sensor design is one that uses a pair of transformer coils to communicate between a primary and secondary coil located in the wheel axle. These transformers are coaxial and face each other. A length of wire connected to the secondary of the transformer pair connects directly with the tire pressure sensor that is located on the periphery of the wheel rim. Another design uses a tire pressure link for electromagnetically coupling a magnetic field between a wheel hub coil and a tire pressure sensor coil that does not use electrical connections or wires that are prone to breakage. The secondary coil in either case is preferably connected to the microprocessor using wireless technology, for example, using an RFID transponder antenna that can be interrogated by the onboard computer containing the microprocessor. It is also possible to use wireless radio transmission of tire pressure from the sensor to a node on the landing gear, which is retransmitted to the TPMS unit. The sensor itself can be a strain gauge, a capacitive gauge, or use an electromagnetic or other principle to measure pressure and convert this measurement to an electric signal.

Figure 3:
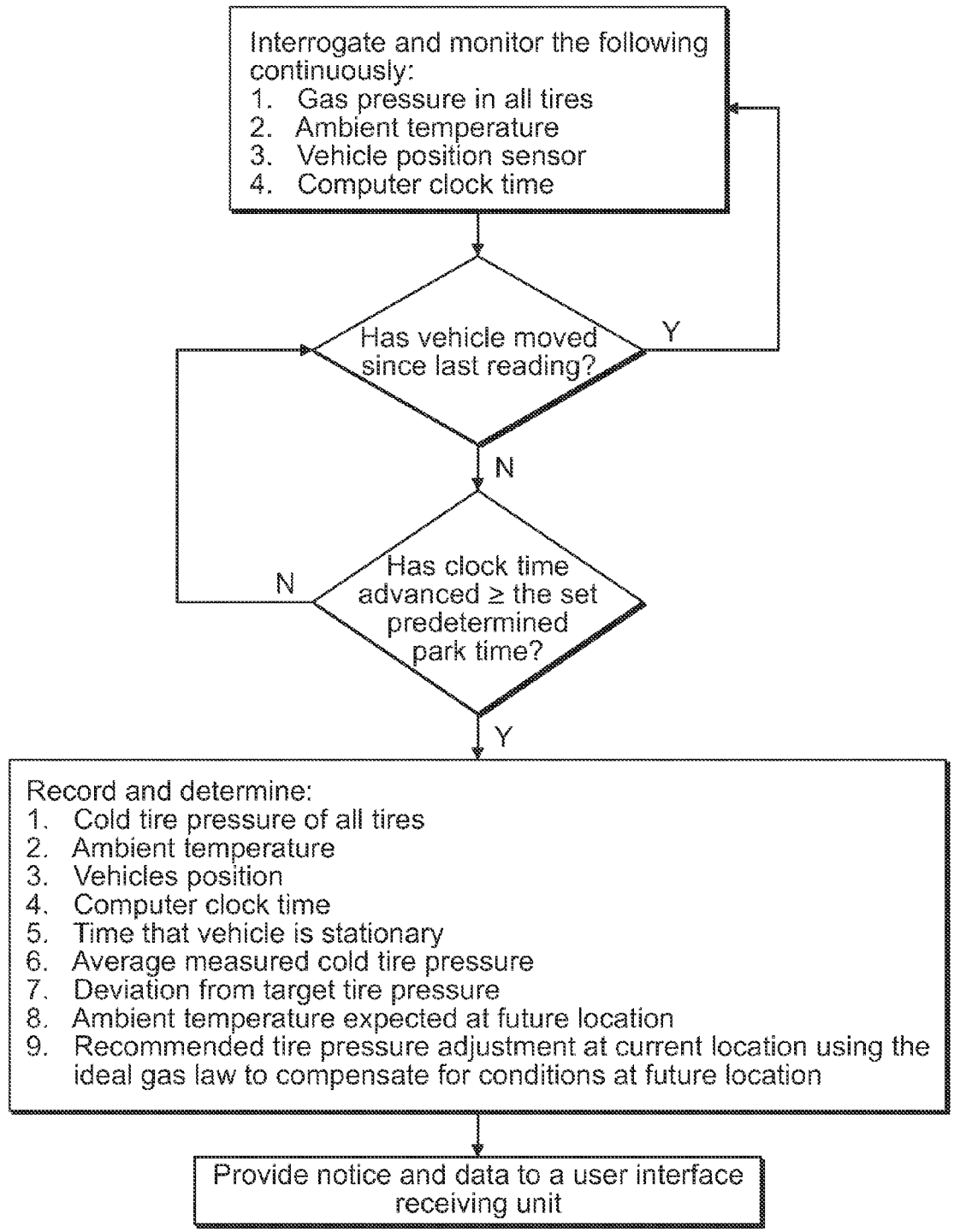
FIG. 3 presents a logic diagram outlining one possible advantageous method of operation of an embodiment of the present invention.

FIG. 3 presents a logic diagram outlining one possible advantageous method of operation of an embodiment of the present invention. Specifically, the TPMS when powered up will continuously monitor and interrogate the gas pressure in each tire, the ambient air temperature, the vehicle position sensor, and the computer clock time. The frequency of this monitoring and interrogation routine can be programmed into the software program uploaded into the computer.

Using the information received from the vehicle position sensor, the TPMS will determine if the vehicle has physically moved since that last interrogation of the vehicle position sensor. If the vehicle has moved, then the monitoring and interrogation routine continues. If the TPMS determines no movement of the vehicle, then the clock time is checked to determine how long the vehicle has remained stationary. If the vehicle has remained stationary for the predetermined time or greater (preferably 3 or more hours), then the TPMS will record and determine the nine listed factors shown in FIG. 3. This information is then provided to a user interface along with any notices indicating that service should be performed.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The invention claimed is:

1. A tire pressure monitoring system for a wheeled vehicle comprising the following components in electronic communication,
   a computer located on the vehicle comprising a data processing unit having a microprocessor configured to execute a processing function for retrieving and modifying data retrieved from electrical components on the vehicle and from data storage units;
   a pressure sensor connected to a wheel and in fluid communication with a pressurized gas contained in a tire mounted to the wheel, where the pressure sensor is configured to transmit gas pressure data indicative of a gas pressure within the tire to the microprocessor; and
   a vehicle position sensor located on the vehicle and in electronic communication with the computer, where the position sensor is configured to track and record the geographic position and movement of the vehicle,
   wherein the computer has a non-transitory computer readable medium having instructions stored thereon that, in response to execution by the microprocessor causes the microprocessor to collect information from the pressure sensor and the vehicle position sensor, to record vehicle data including outside ambient temperature, computer clock time, vehicle position information, and the gas pressure data, and to further cause the microprocessor provide a user with the reports based on the collected information, where the reports are displayed on a graphical interface,
   wherein the computer interrogates the pressure sensor after determining that data from the position sensor indicates that the vehicle has been stationary for a predetermined park time, where the predetermined park time is a time that allows the pressurized gas in the tire to reach a temperature equal to the outside ambient temperature.

2. The monitoring system of claim 1 where the computer is further configured to provide a user with the reports displayed on a graphical interface located on the vehicle.

3. The monitoring system of claim 1 where the computer is further configured to transmit the reports or vehicle data to a remote receiving unit selected from the group consisting of a remote computer, a server, a handheld receiver, a network, the Internet and a combination of same.

4. The monitoring system of claim 1 where the computer is configured to interrogate and receive data from the pressure sensor using wireless technology.

5. The monitoring system of claim 1 where the computer is further configured to include a wireless communication device configured to communicate the reports or vehicle data to a receiving unit not located on the vehicle.

6. The monitoring system of claim 1 where the vehicle data is modified by the microprocessor to generate a corrective tire pressure based on an expected ambient air temperature of a future location of the vehicle.

7. The monitoring system of claim 6 where the corrective tire pressure is provided to an electronic maintenance log before the vehicle is moved to the future location.

8. The monitoring system of claim 1 where the position sensor uses data received from a global positioning system.

9. The monitoring system of claim 1 where the position sensor uses data received from an inertial navigation system located on the vehicle.

10. The monitoring system of claim 1 where the pressure sensor is located on a wheel rim and is configured for wirelessly transmitting tire pressure data using a radio frequency identification system when interrogated by the microprocessor.

11. The monitoring system of claim 1 where the predetermined park time period is greater than or equal to 3 hours.

12. The monitoring system of claim 1 where the computer only records tire pressure data in computer non-volatile memory after determining that the vehicle has been stationary for the predetermined park time.

13. A method of monitoring tire pressure of a tire on a wheeled vehicle comprising the following steps, in combination,
   providing power to a computer located on the vehicle, where the computer comprises a data processing unit containing a microprocessor configured execute instructions stored on a non-transitory computer readable medium; and
   executing the instructions to retrieve and modify vehicle data including ambient outside air temperature, computer clock times and vehicle position information, to interrogate a pressure sensor in fluid communication with pressured gas within a tire to receive gas pressure data indicative of a gas pressure within the tire, and to provide a user with the reports based on the collected information, where the reports are displayed on a graphical interface,
   wherein the vehicle position is determined by interrogating a vehicle position sensor located on the vehicle that is configured to track and record the geographic position and movement of the vehicle,
   wherein the computer interrogates the pressure sensor after determining that data from the position sensor indicates that the vehicle has been stationary for a predetermined park time, where the predetermined park time is a time that allows the pressurized gas in the tire to reach a temperature equal to the ambient temperature.

14. The method of claim 13 where the vehicle data and the reports are transmitted wirelessly to a receiving unit located remotely from the vehicle.

15. The method of claim 13 further comprising:
   a) recording the tire pressure and the ambient outside temperature after the vehicle has remained stationary for at least 3 hours;
   b) determining a future destination of the vehicle and an expected ambient temperature at the future destination;

c) comparing the recorded tire pressure to a target tire pressure and determining whether the tire pressure is over inflated or under inflated;

d) computing a new tire pressure using the expected ambient temperature and the determination made in step c); and e) reporting the new tire pressure to a receiving unit accessible by a user.

16. The method of claim 13 further comprising that a temperature of the gas within the tire is not measured or recorded.

17. The method of claim 13, wherein the vehicle comprises an aircraft.

* * * * *